United States Patent
Kirby et al.

(10) Patent No.: US 9,264,779 B2
(45) Date of Patent: Feb. 16, 2016

(54) USER INTERFACE

(71) Applicant: EchoStar Technologies L.L.C., Englewood, CO (US)

(72) Inventors: Morgan Haden Kirby, Palmer Lake, CO (US); Henry Gregg Martch, Parker, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/095,860

(22) Filed: Dec. 3, 2013

(65) Prior Publication Data

US 2014/0130094 A1 May 8, 2014

Related U.S. Application Data

(63) Continuation of application No. 13/324,831, filed on Dec. 13, 2011, now Pat. No. 8,627,349.

(60) Provisional application No. 61/526,565, filed on Aug. 23, 2011.

(51) Int. Cl.
*H04N 7/025* (2006.01)
*H04N 21/482* (2011.01)
*H04N 21/472* (2011.01)
(Continued)

(52) U.S. Cl.
CPC ....... *H04N 21/4821* (2013.01); *H04N 21/2365* (2013.01); *H04N 21/23895* (2013.01); *H04N 21/2668* (2013.01); *H04N 21/4334* (2013.01); *H04N 21/43853* (2013.01);
(Continued)

(58) Field of Classification Search
CPC ................ H04N 21/47; H04N 21/472; H04N 21/47214; H04N 21/4722; H04N 21/482; H04N 21/4821
USPC ..................... 725/31, 58, 40, 52, 43
See application file for complete search history.

(56) References Cited

U.S. PATENT DOCUMENTS 4,706,121 A 11/1987 Young
4,723,246 A 2/1988 Weldon, Jr.
(Continued)

FOREIGN PATENT DOCUMENTS

CN 101 404 780 A 4/2009
CN 101978690 A 2/2011
(Continued)

OTHER PUBLICATIONS

International Preliminary Report on Patentability for PCT/US2012/052002 mailed on Apr. 17, 2014, 10 pages.
(Continued)

*Primary Examiner* — James R Sheleheda
(74) *Attorney, Agent, or Firm* — Kilpatrick Townsend & Stockton LLP

(57) ABSTRACT

A method of providing access to a block of stored content includes transmitting a general EPG at a content receiver for display on a presentation device, the EPG including a plurality of channels having a plurality of programs available at a plurality of times, receiving input from a user to display a block guide, and transmitting the block guide wherein, the block guide is associated with the block of stored content for accessing the block of stored content, the block guide including a plurality of channels having a plurality of programs available for a selected airing time.

20 Claims, 8 Drawing Sheets

(51) Int. Cl.
  *H04N 21/2365* (2011.01)
  *H04N 21/2389* (2011.01)
  *H04N 21/2668* (2011.01)
  *H04N 21/433* (2011.01)
  *H04N 21/4385* (2011.01)
  *H04N 21/462* (2011.01)

(52) U.S. Cl.
  CPC .... *H04N 21/4622* (2013.01); *H04N 21/47214* (2013.01); *H04N 21/4823* (2013.01); *H04N 21/4825* (2013.01)

(56) References Cited

U.S. PATENT DOCUMENTS

| | | |
|---|---|---|
| 4,802,215 A | 1/1989 | Mason |
| 5,187,589 A | 2/1993 | Kono et al. |
| 5,335,277 A | 8/1994 | Harvey et al. |
| 5,483,277 A | 1/1996 | Granger |
| 5,488,658 A | 1/1996 | Hirashima |
| 5,541,738 A | 7/1996 | Mankovitz |
| 5,642,153 A | 6/1997 | Chaney et al. |
| 5,682,597 A | 10/1997 | Ganek et al. |
| 5,684,969 A | 11/1997 | Ishida |
| 5,724,646 A | 3/1998 | Ganek et al. |
| 5,805,763 A | 9/1998 | Lawler et al. |
| 5,974,218 A | 10/1999 | Nagasaka et al. |
| 6,005,562 A | 12/1999 | Shiga et al. |
| 6,049,333 A | 4/2000 | LaJoie et al. |
| 6,177,931 B1 | 1/2001 | Alexander et al. |
| 6,263,504 B1 | 7/2001 | Ebisawa |
| 6,453,115 B1 | 9/2002 | Boyle |
| 6,628,891 B1 | 9/2003 | Vantalon et al. |
| 6,681,396 B1 | 1/2004 | Bates et al. |
| 6,701,528 B1 | 3/2004 | Arsenault et al. |
| 6,766,523 B2 | 7/2004 | Herley |
| 6,798,971 B2 | 9/2004 | Potrebic |
| 6,938,208 B2 | 8/2005 | Reichardt |
| 7,024,676 B1 | 4/2006 | Klopfenstein |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,505,081 B2 | 3/2009 | Eshleman |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,633,887 B2 | 12/2009 | Panwar et al. |
| 7,680,894 B2 | 3/2010 | Diot et al. |
| 7,684,672 B2 | 3/2010 | Matoba |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,774,811 B2 | 8/2010 | Poslinski et al. |
| 7,804,861 B2 | 9/2010 | Kim |
| 7,818,368 B2 | 10/2010 | Yang et al. |
| 7,825,989 B1 | 11/2010 | Greenberg |
| 7,848,618 B2 | 12/2010 | Potrebic et al. |
| 7,849,487 B1 | 12/2010 | Vosseller |
| 7,856,557 B2 | 12/2010 | Beuque |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,006,268 B2 | 8/2011 | Sloo |
| 8,046,798 B1 | 10/2011 | Schlack et al. |
| 8,079,052 B2 | 12/2011 | Chen et al. |
| 8,104,065 B2 | 1/2012 | Aaby et al. |
| 8,201,194 B2 | 6/2012 | Wijnands et al. |
| 8,209,713 B1 | 6/2012 | Lai et al. |
| 8,296,797 B2 | 10/2012 | Olstad et al. |
| 8,312,486 B1 | 11/2012 | Briggs et al. |
| 8,321,466 B2 | 11/2012 | Black et al. |
| 8,364,671 B1 | 1/2013 | Sinton et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 * | 1/2014 | Kirby et al. .................. 725/31 |
| 8,660,412 B2 | 2/2014 | Kummer et al. |
| 8,689,258 B2 | 4/2014 | Kemp |
| 8,763,027 B2 | 6/2014 | Martch |
| 8,774,608 B2 | 7/2014 | Kummer et al. |
| 8,819,722 B2 | 8/2014 | Kummer et al. |
| 8,819,761 B2 | 8/2014 | Minnick |
| 8,850,476 B2 | 9/2014 | VanDuyn et al. |
| 8,867,893 B2 | 10/2014 | Kirby |
| 8,959,544 B2 | 2/2015 | Kummer et al. |
| 8,959,566 B2 | 2/2015 | Kummer |
| 8,973,038 B2 | 3/2015 | Gratton |
| 9,031,385 B2 | 5/2015 | Casagrande et al. |
| 9,043,843 B2 | 5/2015 | Templeman et al. |
| 9,055,274 B2 | 6/2015 | Casagrande |
| 9,066,156 B2 | 6/2015 | Kapa |
| 9,088,763 B2 | 7/2015 | Martch et al. |
| 9,113,222 B2 | 8/2015 | VanDuyn |
| 9,177,605 B2 | 11/2015 | Minnick et al. |
| 9,177,606 B2 | 11/2015 | Kirby |
| 9,185,331 B2 | 11/2015 | Martch et al. |
| 9,191,694 B2 | 11/2015 | Casagrande |
| 2001/0013123 A1 | 8/2001 | Freeman et al. |
| 2001/0026609 A1 | 10/2001 | Weinstein et al. |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2002/0044658 A1 | 4/2002 | Wasilewski et al. |
| 2002/0054752 A1 | 5/2002 | Wood et al. |
| 2002/0055343 A1 | 5/2002 | Stetzler et al. |
| 2002/0059610 A1 | 5/2002 | Ellis |
| 2002/0075402 A1 | 6/2002 | Robson et al. |
| 2002/0087979 A1 | 7/2002 | Dudkiewicz et al. |
| 2002/0087983 A1 | 7/2002 | Son et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0116705 A1 | 8/2002 | Perlman |
| 2002/0120925 A1 | 8/2002 | Logan |
| 2002/0141431 A1 | 10/2002 | Tripathy |
| 2002/0144266 A1 | 10/2002 | Goldman et al. |
| 2002/0152299 A1 | 10/2002 | Traversat et al. |
| 2002/0164147 A1 | 11/2002 | Hirofumi |
| 2002/0168178 A1 | 11/2002 | Rodriguez et al. |
| 2002/0174430 A1 | 11/2002 | Ellis et al. |
| 2002/0178444 A1 | 11/2002 | Trajkovic et al. |
| 2002/0184638 A1 | 12/2002 | Agnihortri et al. |
| 2002/0188943 A1 | 12/2002 | Freeman et al. |
| 2003/0005454 A1 | 1/2003 | Rodriguez et al. |
| 2003/0023742 A1 | 1/2003 | Allen et al. |
| 2003/0026423 A1 | 2/2003 | Unger et al. |
| 2003/0066077 A1 | 4/2003 | Gutta et al. |
| 2003/0078930 A1 | 4/2003 | Surcouf et al. |
| 2003/0110514 A1 | 6/2003 | West et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0149988 A1 | 8/2003 | Ellis et al. |
| 2003/0152360 A1 | 8/2003 | Mukai et al. |
| 2003/0156826 A1 | 8/2003 | Sonoda et al. |
| 2003/0177492 A1 | 9/2003 | Kanou |
| 2003/0177495 A1 | 9/2003 | Needham et al. |
| 2003/0188317 A1 | 10/2003 | Liew et al. |
| 2003/0189674 A1 | 10/2003 | Inoue et al. |
| 2003/0200548 A1 | 10/2003 | Baran et al. |
| 2003/0208763 A1 | 11/2003 | McElhatten et al. |
| 2003/0208767 A1 | 11/2003 | Williamson et al. |
| 2003/0226150 A1 | 12/2003 | Berberet et al. |
| 2004/0001087 A1 | 1/2004 | Warmus et al. |
| 2004/0003118 A1 | 1/2004 | Brown et al. |
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0103428 A1 | 5/2004 | Seok et al. |
| 2004/0128682 A1 | 7/2004 | Liga et al. |

(56) References Cited

U.S. PATENT DOCUMENTS

| | | |
|---|---|---|
| 2004/0133923 A1 | 7/2004 | Watson et al. |
| 2004/0162871 A1 | 8/2004 | Pabla et al. |
| 2004/0181807 A1 | 9/2004 | Theiste et al. |
| 2004/0218905 A1 | 11/2004 | Green et al. |
| 2004/0242150 A1 | 12/2004 | Wright et al. |
| 2004/0268387 A1 | 12/2004 | Wendling |
| 2005/0002640 A1 | 1/2005 | Putterman |
| 2005/0030977 A1 | 2/2005 | Casey et al. |
| 2005/0034171 A1 | 2/2005 | Benya |
| 2005/0044570 A1 | 2/2005 | Poslinski |
| 2005/0071865 A1 | 3/2005 | Martins |
| 2005/0083865 A1 | 4/2005 | Ashley et al. |
| 2005/0120049 A1 | 6/2005 | Kanegae et al. |
| 2005/0125302 A1 | 6/2005 | Brown et al. |
| 2005/0125683 A1 | 6/2005 | Matsuyama et al. |
| 2005/0147383 A1 | 7/2005 | Ihara |
| 2005/0166230 A1 | 7/2005 | Gaydou et al. |
| 2005/0180568 A1* | 8/2005 | Krause .................... 380/212 |
| 2005/0229213 A1 | 10/2005 | Ellis et al. |
| 2005/0240961 A1 | 10/2005 | Jerding et al. |
| 2005/0264705 A1 | 12/2005 | Kitamura |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2006/0010464 A1 | 1/2006 | Tomohiro |
| 2006/0020962 A1* | 1/2006 | Stark et al. .................. 725/32 |
| 2006/0056800 A1 | 3/2006 | Shimagami et al. |
| 2006/0075434 A1 | 4/2006 | Chaney et al. |
| 2006/0080716 A1 | 4/2006 | Nishikawa et al. |
| 2006/0085828 A1* | 4/2006 | Dureau et al. ............. 725/100 |
| 2006/0174277 A1 | 8/2006 | Sezan et al. |
| 2006/0190615 A1 | 8/2006 | Panwar et al. |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0238656 A1 | 10/2006 | Chen et al. |
| 2006/0253581 A1 | 11/2006 | Dixon et al. |
| 2006/0274208 A1 | 12/2006 | Pedlow, Jr. |
| 2006/0282869 A1 | 12/2006 | Plourde, Jr. |
| 2007/0016546 A1 | 1/2007 | De Vorchik et al. |
| 2007/0033616 A1 | 2/2007 | Gutta |
| 2007/0039032 A1 | 2/2007 | Goldey et al. |
| 2007/0058930 A1 | 3/2007 | Iwamoto, Toru |
| 2007/0061378 A1 | 3/2007 | Lee et al. |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157248 A1 | 7/2007 | Ellis |
| 2007/0157249 A1 | 7/2007 | Cordray et al. |
| 2007/0157253 A1 | 7/2007 | Ellis et al. |
| 2007/0165855 A1 | 7/2007 | Inui |
| 2007/0183745 A1 | 8/2007 | White |
| 2007/0188655 A1 | 8/2007 | Ohta |
| 2007/0192586 A1 | 8/2007 | McNeely |
| 2007/0204288 A1 | 8/2007 | Candelore |
| 2007/0226766 A1 | 9/2007 | Poslinski et al. |
| 2007/0234395 A1 | 10/2007 | Dureau et al. |
| 2007/0245379 A1 | 10/2007 | Agnihortri |
| 2007/0250856 A1 | 10/2007 | Leavens et al. |
| 2007/0258596 A1 | 11/2007 | Kahn et al. |
| 2008/0022012 A1 | 1/2008 | Wang |
| 2008/0022347 A1 | 1/2008 | Cohen |
| 2008/0046929 A1 | 2/2008 | Cho et al. |
| 2008/0052743 A1 | 2/2008 | Moore |
| 2008/0074547 A1 | 3/2008 | Ida |
| 2008/0086743 A1 | 4/2008 | Cheng et al. |
| 2008/0092164 A1 | 4/2008 | Agarwal et al. |
| 2008/0092181 A1 | 4/2008 | Britt |
| 2008/0097949 A1 | 4/2008 | Kelly et al. |
| 2008/0101760 A1 | 5/2008 | Waller |
| 2008/0104534 A1 | 5/2008 | Park et al. |
| 2008/0109307 A1 | 5/2008 | Ullah |
| 2008/0127253 A1 | 5/2008 | Zhang et al. |
| 2008/0134043 A1 | 6/2008 | Georgis et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0195457 A1 | 8/2008 | Sherman et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0235348 A1 | 9/2008 | Dasgupta |
| 2008/0271077 A1 | 10/2008 | Kim et al. |
| 2008/0273698 A1 | 11/2008 | Manders et al. |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0300982 A1 | 12/2008 | Larson et al. |
| 2008/0301740 A1 | 12/2008 | Tsutsui |
| 2008/0307217 A1 | 12/2008 | Yukimatsu et al. |
| 2008/0320523 A1 | 12/2008 | Morris et al. |
| 2009/0025027 A1 | 1/2009 | Craner |
| 2009/0051579 A1 | 2/2009 | Inaba et al. |
| 2009/0055385 A1 | 2/2009 | Jeon et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0102984 A1 | 4/2009 | Arling et al. |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1 | 5/2009 | Aisu |
| 2009/0150941 A1 | 6/2009 | Riedl et al. |
| 2009/0165057 A1 | 6/2009 | Miller et al. |
| 2009/0172722 A1 | 7/2009 | Kahn et al. |
| 2009/0178071 A1 | 7/2009 | Whitehead |
| 2009/0178098 A1 | 7/2009 | Westbrook et al. |
| 2009/0210912 A1 | 8/2009 | Cholas et al. |
| 2009/0234828 A1 | 9/2009 | Pei-Hsuan |
| 2009/0235298 A1 | 9/2009 | Carlberg et al. |
| 2009/0249412 A1 | 10/2009 | Bhogal et al. |
| 2009/0254962 A1 | 10/2009 | Hendricks et al. |
| 2009/0260038 A1 | 10/2009 | Acton et al. |
| 2009/0299824 A1 | 12/2009 | Bames, Jr. |
| 2009/0320073 A1 | 12/2009 | Reisman |
| 2009/0320084 A1 | 12/2009 | Azam et al. |
| 2009/0324203 A1 | 12/2009 | Wiklof |
| 2009/0325523 A1 | 12/2009 | Choi |
| 2010/0020794 A1 | 1/2010 | Cholas et al. |
| 2010/0037282 A1 | 2/2010 | Iwata et al. |
| 2010/0040151 A1 | 2/2010 | Garrett |
| 2010/0043022 A1 | 2/2010 | Kaftan |
| 2010/0050225 A1 | 2/2010 | Bennett |
| 2010/0071062 A1 | 3/2010 | Choyi et al. |
| 2010/0086277 A1 | 4/2010 | Craner |
| 2010/0089996 A1 | 4/2010 | Koplar |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0122294 A1 | 5/2010 | Craner |
| 2010/0135639 A1 | 6/2010 | Ellis et al. |
| 2010/0146581 A1 | 6/2010 | Erk |
| 2010/0153999 A1 | 6/2010 | Yates |
| 2010/0158479 A1* | 6/2010 | Craner .......................... 386/92 |
| 2010/0158480 A1 | 6/2010 | Jung et al. |
| 2010/0162285 A1 | 6/2010 | Cohen et al. |
| 2010/0166389 A1 | 7/2010 | Knee et al. |
| 2010/0169925 A1 | 7/2010 | Takegoshi |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0232604 A1 | 9/2010 | Eklund, II |
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251295 A1 | 9/2010 | Amento et al. |

(56) References Cited

U.S. PATENT DOCUMENTS

| | | |
|---|---|---|
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0262986 A1 | 10/2010 | Adimatyam et al. |
| 2010/0265391 A1 | 10/2010 | Muramatsu et al. |
| 2010/0269144 A1 | 10/2010 | Forsman et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319019 A1 | 12/2010 | Zazza |
| 2010/0319037 A1 | 12/2010 | Kim |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0016492 A1 | 1/2011 | Morita |
| 2011/0043652 A1 | 2/2011 | King et al. |
| 2011/0072448 A1 | 3/2011 | Stiers et al. |
| 2011/0078750 A1 | 3/2011 | Tam et al. |
| 2011/0080529 A1 | 4/2011 | Wong |
| 2011/0099364 A1 | 4/2011 | Robyr et al. |
| 2011/0109801 A1 | 5/2011 | Thomas et al. |
| 2011/0131413 A1 | 6/2011 | Moon et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |
| 2011/0162011 A1 | 6/2011 | Hassell et al. |
| 2011/0179453 A1 | 7/2011 | Poniatowski |
| 2011/0202956 A1 | 8/2011 | Connelly et al. |
| 2011/0206342 A1 | 8/2011 | Thompson et al. |
| 2011/0225616 A1 | 9/2011 | Ellis |
| 2011/0235701 A1 | 9/2011 | Kim |
| 2011/0239249 A1* | 9/2011 | Murison et al. ............ 725/39 |
| 2011/0255002 A1 | 10/2011 | Witheiler |
| 2011/0286719 A1 | 11/2011 | Woods |
| 2011/0286721 A1 | 11/2011 | Craner |
| 2011/0293113 A1 | 12/2011 | McCarthy |
| 2011/0311045 A1 | 12/2011 | Candelore et al. |
| 2012/0060178 A1 | 3/2012 | Minakuchi et al. |
| 2012/0106932 A1 | 5/2012 | Grevers, Jr. |
| 2012/0131613 A1 | 5/2012 | Ellis et al. |
| 2012/0183276 A1 | 7/2012 | Quan et al. |
| 2012/0185895 A1 | 7/2012 | Wong et al. |
| 2012/0198501 A1 | 8/2012 | Ruan et al. |
| 2012/0204209 A1 | 8/2012 | Kubo |
| 2012/0230651 A1 | 9/2012 | Chen |
| 2012/0236933 A1 | 9/2012 | Saitoh |
| 2012/0246672 A1 | 9/2012 | Sridhar et al. |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311633 A1 | 12/2012 | Mandrekar et al. |
| 2012/0311634 A1 | 12/2012 | Van Duyn |
| 2012/0331505 A1 | 12/2012 | Chun et al. |
| 2013/0014146 A1 | 1/2013 | Bhatia et al. |
| 2013/0014159 A1* | 1/2013 | Wiser et al. ............ 725/34 |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0061313 A1 | 3/2013 | Cullimore et al. |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0174196 A1 | 7/2013 | Herlein |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0283162 A1 | 10/2013 | Aronsson et al. |
| 2013/0298151 A1 | 11/2013 | Leske et al. |
| 2013/0298166 A1 | 11/2013 | Herrington et al. |
| 2013/0332962 A1 | 12/2013 | Moritz et al. |
| 2013/0347037 A1 | 12/2013 | Soroushian |
| 2014/0032709 A1 | 1/2014 | Saussy et al. |
| 2014/0047477 A1 | 2/2014 | Vanduyn |
| 2014/0050462 A1 | 2/2014 | Kummer et al. |
| 2014/0068675 A1 | 3/2014 | Mountain |
| 2014/0123160 A1 | 5/2014 | van Coppenolle et al. |
| 2014/0126889 A1 | 5/2014 | Kummer et al. |
| 2014/0140680 A1 | 5/2014 | Jo |
| 2014/0153904 A1 | 6/2014 | Adimatyam et al. |
| 2014/0201767 A1 | 7/2014 | Seiden et al. |
| 2014/0282714 A1 | 9/2014 | Hussain |
| 2014/0282741 A1 | 9/2014 | Shoykhet |
| 2014/0282745 A1 | 9/2014 | Chipman et al. |
| 2014/0282759 A1 | 9/2014 | Harvey et al. |
| 2014/0310819 A1 | 10/2014 | Cakarel et al. |
| 2014/0313341 A1 | 10/2014 | Stribling |
| 2014/0331260 A1 | 11/2014 | Gratton |
| 2014/0341377 A1 | 11/2014 | Kummer et al. |
| 2014/0344858 A1 | 11/2014 | Minnick |
| 2014/0363139 A1 | 12/2014 | Kirby |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040166 A1 | 2/2015 | Tamura et al. |
| 2015/0058890 A1 | 2/2015 | Kapa |
| 2015/0095932 A1 | 4/2015 | Ren |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0181132 A1 | 6/2015 | Kummer et al. |
| 2015/0181279 A1 | 6/2015 | Martch et al. |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Protrebic |
| 2015/0245113 A1 | 8/2015 | Casagrande |

FOREIGN PATENT DOCUMENTS

| | | |
|---|---|---|
| EP | 0 903 743 A | 3/1999 |
| EP | 0 973 333 A | 1/2000 |
| EP | 1 001 631 A1 | 5/2000 |
| EP | 1 168 347 A | 1/2002 |
| EP | 1372339 A2 | 12/2003 |
| EP | 1 447 983 A1 | 8/2004 |
| EP | 1 742 467 A2 | 1/2007 |
| EP | 1 865 716 A2 | 12/2007 |
| EP | 2 018 059 A1 | 1/2009 |
| EP | 2 309 733 B1 | 4/2011 |
| EP | 2 317 767 A1 | 5/2011 |
| EP | 2 357 563 A1 | 8/2011 |
| EP | 1 667 452 B1 | 11/2011 |
| EP | 2 403 239 A1 | 1/2012 |
| EP | 2 541 929 A1 | 1/2013 |
| EP | 2 826 197 A1 | 1/2015 |
| EP | 2 826 238 A1 | 1/2015 |
| FR | 2 902 568 A1 | 12/2007 |
| IN | 9740/CHENP/2013 A | 9/2014 |

(56) References Cited

FOREIGN PATENT DOCUMENTS

| JP | H10 322622 A | 12/1998 |
|---|---|---|
| JP | 2006/245745 A | 9/2006 |
| JP | 2007 116525 A | 5/2007 |
| KR | 2004 0025073 A | 3/2004 |
| KR | 2006 0128295 A | 12/2006 |
| WO | 98/12872 A1 | 3/1998 |
| WO | 98/37694 A1 | 8/1998 |
| WO | 02/41625 A1 | 5/2002 |
| WO | 2004/057610 A1 | 7/2004 |
| WO | 2005/059807 A2 | 6/2005 |
| WO | 2007/047410 A2 | 4/2007 |
| WO | 2007/064987 A2 | 6/2007 |
| WO | 2007/098067 A1 | 8/2007 |
| WO | 2008/010689 A1 | 1/2008 |
| WO | 2008/060486 A2 | 5/2008 |
| WO | 2009/073925 A1 | 6/2009 |
| WO | 2011/027236 A1 | 3/2011 |
| WO | 2011/081729 A1 | 7/2011 |
| WO | 2012/003693 A1 | 1/2012 |
| WO | 2013/016626 A1 | 1/2013 |
| WO | 2013/028824 A2 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |
| WO | 2014-179017 A1 | 11/2014 |

OTHER PUBLICATIONS

International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
U.S. Appl. No. 13/288,002, filed Nov. 2, 2011, Final Office Action mailed Mar. 27, 2014, 20 pages.
U.S. Appl. No. 13/614,899, filed Sep. 13, 2012, Final Office Action mailed Mar. 17, 2014, 41 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Notice of Allowance mailed Apr. 23, 2014, 141 pages.
Extended European Search Report for EP 14160140.1 received Jul. 7, 2014, 7 pages.
Extended European Search Report for EP 11166892.7 dated Oct. 6, 2011, 7 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug. 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
U.S. Appl. No. 13/942,451, filed Jul. 15, 2013 Non Final Office Action mailed Jul. 28, 2014, 27 pages.
U.S. Appl. No. 13/919,702, filed Jun. 17, 2013 Non Final Office Action mailed Jun. 11, 2014, 25 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Search Report and Written Opinion of PCT/US2014/033796 mailed Sep. 5, 2014, 12 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Search Report and Written Opinion of PCT/US2013/031440 mailed May 30, 2013, 14 pages.
International Preliminary Report on Patentability for PCT/US2013/031440 Sep. 25, 2014, 8 pages.
International Preliminary Report on Patentability for PCT/US2013/031915 issued Sep. 16, 2014, 5 pages.
U.S. Appl. No. 13/302,852, filed Nov. 22, 2011, Non-Final Rejection mailed Sep. 2, 2014, 28 pages.
U.S. Appl. No. 13/793,636, filed Mar. 11, 2013, Non-Final Office Action mailed Sep. 29, 2014, 27 pages.
U.S. Appl. No. 13/800,477, filed Mar. 13, 2013 Non-Final Office Action mailed Sep. 11, 2014, 34 pages.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV It's simply great television," Accessed on Oct. 13, 2014, 11 pages. Retrieved from https//ee.co.uk/ee-and-me/ee-tv.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.
Author Unknown, "Move Networks is Delivering the Next Generation of Television," Move Networks, 2010, obtained online at http://movenetworks.com/, 2 pages.
Jung, J., et al., "Design and Implementation of a Multi-Stream CableCARD with a High-Speed DVB-Common Descrambler," ACM Multimedia, 2006, 4 pages.
U.S. Appl. No. 13/149,852, filed May 31, 2011, Non-Final Office Action mailed Dec. 12, 2012, 9 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.

(56) References Cited

OTHER PUBLICATIONS

U.S. Appl. No. 13/286,157, filed Oct. 31, 2011, Non-Final Office Action mailed Jan. 17, 2013, 20 pages.
U.S. Appl. No. 13/286,157, filed Oct 31, 2011 Non-Final Office Action mailed Jul. 25, 2013, 49 pages.
U.S. Appl. No. 13/286,157, filed Oct 31, 2011 Notice of Allowance mailed Feb. 3, 2014, 81 pages.
U.S. Appl. No. 13/215,702, filed Aug. 23, 2011 Notice of Allowance mailed Feb. 11, 2013, 13 pages.
U.S. Appl. No. 13/288,002, filed Nov. 2, 2011 Non-final Office Action mailed Sep. 26, 2013, 15 pages.
U.S. Appl. No. 13/302,852, filed Nov. 22, 2011 Non-Final Rejection mailed May 23, 2013, 19 pages.
U.S. Appl. No. 13/302,852, filed Nov. 22, 2011 Final Rejection mailed Dec. 9, 2013, 23 pages.
U.S. Appl. No. 13/324,831, filed Dec. 13, 2011 Non-Final Office Action mailed Feb. 28, 2013, 23 pages.
U.S. Appl. No. 13/324,831, filed Dec. 13, 2011 Notice of Allowance mailed Sep. 4, 2013, 22 pages.
U.S. Appl. No. 13/292,047, filed Nov. 8, 2011 Non-Final Office Action mailed Jan. 18, 2013, 17 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Feb. 5, 2013, 17 pages.
U.S. Appl. No. 13/614,899, filed Sep. 13, 2012 Non-Final Office Action mailed Sep. 17, 2013, 17 pages.
U.S. Appl. No. 13/291,014, filed Nov. 7, 2011 Non-Final Office Action mailed Mar. 29, 2013, 21 pages.
U.S. Appl. No. 13/291,014, filed Nov. 7, 2011 Notice of Allowance mailed Aug. 7, 2013, 16 pages.
U.S. Appl. No. 13/215,598, filed Aug. 23, 2011 Non-Final Office Action mailed Jun. 20, 2013, 15 pages.
U.S. Appl. No. 13/215,598, filed Aug. 23, 2011 Final Office Action mailed Nov. 21, 2013, 23 pages.
U.S. Appl. No. 13/215,598, filed Aug 23, 2011 Non-Final Office Action mailed Feb. 6, 2014, 12 pages.
U.S. Appl. No. 13/215,655, filed Aug. 23, 2011 Non-Final Office Action mailed Sep. 6, 2013, 27 pages.
U.S. Appl. No. 13/215,655, filed Aug. 23, 2011 Final Office Action mailed Dec. 18, 2013, 20 pages.
U.S. Appl. No. 13/215,916, filed Aug. 23, 2011 Notice of Allowance mailed Jan. 4, 2013, 10 pages.
U.S. Appl. No. 13/294,005, filed Nov. 11, 2011 Non-Final Office Action mailed Aug. 14, 2013, 32 pages.
U.S. Appl. No. 13/294,005, filed Nov. 11, 2011 Final Office Action mailed Jan. 3, 2014, 29 pages.
U.S. Appl. No. 13/592,976, filed Aug. 23, 2012 Notice of Allowance mailed Oct. 7, 2013, 18 pages.
U.S. Appl. No. 13/829,350, filed Mar. 14, 2013, Non Final Office Action mailed Feb. 28, 2014, 29 pages.
U.S. Appl. No. 13/799,719, filed Mar. 13, 2013, Non Final Office Action mailed Oct. 25, 2013, 79 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
International Search Report of PCT/KR2007/003521 mailed on Oct. 23, 2007, 22 pages.
International Search Report of PCT/IB2003/005737 mailed on Mar. 3, 2004, 21 pages.
Jensen, Craig, "Fragmentation: the condition, the cause, the cure" Online!, Executive Software International, 1994; ISBN: 0964004909; retrieved from Internet: <URL: www.executive.com/fragbook/fragbook.htm> * Chapter: "How a disk works", Section: "The original problem". Retrieved on Jan. 9, 2014.
U.S. Appl. No. 13/795,914, filed Mar. 6, 2013, Non-Final Office Action mailed Oct. 11, 2013, 17 pages.
International Search Report and Written Opinion of PCT/US2013/32176 mailed on Jun. 25, 2013, 15 pages.
International Search Report and Written Opinion of PCT/US2013/031565 mailed on May 31, 2013, 82 pages.
International Search Report and Written Opinion of PCT/US2013/031915 mailed on Jun. 3, 2013, 7 pages.
Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
European Search Report for EP 14197940.1 mailed Apr. 28, 2015, 13 pages.
The Notice of Allowance by the Mexican Institute of Industrial Property for Mexican Patent Application No. MX/a/2013/014671 dated Apr. 17, 2015, 1 page.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
U.S. Appl. No. 14/467,959, filed Aug. 25, 2014 Notice of Allowance mailed Jun. 22, 2015, 36 pages.
U.S. Appl. No. 14/200,864, filed Mar. 7, 2014, Final Office Action mailed Jun. 18, 2015, 36 pages.
U.S. Appl. No. 14/139,420, filed Dec. 23, 2013 Non-Final Office Action mailed Apr. 30, 2015, 27 pages.
U.S. Appl. No. 14/071,613, filed Nov. 4, 2013 Non-Final Office Action mailed May 18, 2015, 20 pages.
U.S. Appl. No. 13/942,451, filed Jul. 15, 2013 Final Office Action mailed Apr. 30, 2015, 33 pages.
U.S. Appl. No. 13/919,702, filed Jun. 17, 2013 Non-Final Office Action mailed Apr. 30, 2015, 26 pages.
U.S. Appl. No. 13/801,968, filed Mar. 13, 2013 Non Final Office Action mailed May 21, 2015, 49 pages.
U.S. Appl. No. 13/799,604, filed Mar. 13, 2013, Notice of Allowance mailed May 29, 2015, 46 pages.
U.S. Appl. No. 13/302,852, filed Nov. 22, 2011, Notice of Allowance mailed Jun. 19, 2015, 26 pages.
U.S. Appl. No. 13/292,047, filed Nov. 8, 2011 Non-Final Office Action mailed Jul. 7, 2015, 28 pages.
U.S. Appl. No. 13/215,598, filed Aug 23, 2011 Final Office Action mailed May 5, 2015, 17 pages.
U.S. Appl. No. 13/888,012, filed May 6, 2013 Notice of Allowance mailed Jul. 14, 2015, 18 pages.
U.S. Appl. No. 13/856,752, filed Apr. 4, 2013 Notice of Allowance mailed Feb. 10, 2015, 20 pages.
U.S. Appl. No. 13/799,604, filed Mar. 13, 2013, Final Office Action mailed Jan. 14, 2015, 36 pages.
U.S. Appl. No. 13/797,173, filed Mar. 12, 2013 Notice of Allowance mailed Feb. 26, 2015, 19 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.
Extended European Search Report for EP 12825474 mailed Jan. 7, 2015, 6 pages.
Extended European Search Report for EP 12825430 mailed Feb. 3, 2015, all pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
U.S. Appl. No. 14/340,190, filed Jul. 24, 2014, Non-Final Rejection mailed Aug. 31, 2015, 74 pages.
U.S. Appl. No. 14/154,887, filed Jan. 14, 2014 Non-Final Rejection mailed Jul. 17, 2015, 33 pages.
U.S. Appl. No. 13/799,604, filed Mar. 13, 2013, Notice of Allowance mailed Jul. 24, 2015, 34 pages.
U.S. Appl. No. 13/288,002, filed Nov. 2, 2011 Non Final Rejection mailed Jul. 28, 2015, 29 pages.

(56) References Cited

OTHER PUBLICATIONS

U.S. Appl. No. 13/829,350, filed Mar. 14, 2013 Notice of Allowance mailed Jul. 24, 2015, 29 pages.
U.S. Appl. No. 14/470,248, filed Aug. 27, 2014, Preinterview first office action mailed Sep. 4, 2015, 22 pages.
U.S. Appl. No. 14/470,279, filed Aug. 27, 2014, Preinterview first office action mailed Aug. 26, 2015, 23 pages.
U.S. Appl. No. 14/479,007, filed Sep. 5, 2014, Non-Final Office Action mailed Sep. 1, 2015, 44 pages.
U.S. Appl. No. 14/043,617, filed Oct. 1, 2013 Final Office Action mailed Jul. 16, 2015, 45 pages.
U.S. Appl. No. 14/139,299, filed Dec. 23, 2013, Non Final Office Action mailed Aug. 14, 2015, 39 pages.
Supplementary European Search Report for EP 13761291.7 mailed Jul. 9, 2015, 8 pages.
Extended European Search Report for EP 13760237.1 received Jul. 21, 2015, 8 pages.
First Office Action and Search Report from the State Intellectual Property Office (SIPO) for CN 201280031434.7, issued Jul. 17, 2015, 12 pages.
Office Action dated Jul. 31, 2015 for Mexican Patent Application No. MX/a/2014/009928, 2 pages.
Extended European Search Report for EP 12825080, mailed Sep. 11, 2014, 10 pages.
Extended European Search Report for EP 12825521, mailed Nov. 24, 2014, 7 pages.
The Office Action dated Nov. 6, 2014 for Mexican Patent Application No. MX/a/2013/014677 is not translated into English. This document is from prosecution of the corresponding foreign matter for which we do not have a translation, 2 pages.
U.S. Appl. No. 14/200,864, filed Mar. 7, 2014, Non-Final Office Action mailed Dec. 5, 2014, 35 pages.
U.S. Appl. No. 14/043,617, filed Oct. 1, 2013, Non-Final Office Action mailed Jan. 5, 2015, 45 pages.
U.S. Appl. No. 13/971,579, filed Aug. 20, 2013, Non Final Office Action mailed Oct. 28, 2014, 35 pages.
U.S. Appl. No. 13/919,702, filed Jun. 17, 2013, Final Office Action mailed Nov. 18, 2014, 24 pages.
U.S. Appl. No. 13/886,873, filed May 3, 2013, Notice of Allowance mailed Oct. 24, 2014, 40 pages.
U.S. Appl. No. 13/856,752, filed Apr. 4, 2013, Non Final Office Action mailed Nov. 5, 2014, 34 pages.
U.S. Appl. No. 13/829,350, filed Mar. 14, 2013, Final Office Action mailed Jan. 23, 2015, 18 pages.
U.S. Appl. No. 13/799,653, filed Mar. 13, 2013, Notice of Allowance mailed Nov. 26, 2014, 32 pages.
U.S. Appl. No. 13/797,173, filed Mar. 12, 2013, Notice of Allowance mailed Nov. 24, 2014, 37 pages.
U.S. Appl. No. 13/757,168, filed Feb. 1, 2013, Notice of Allowance mailed Oct. 14, 2014, 28 pages.
U.S. Appl. No. 13/292,047, filed Nov. 8, 2011, Final Office Action mailed Jan. 13, 2015, 22 pages.
U.S. Appl. No. 13/215,598, filed Aug. 23, 2011, Non-Final Office Action mailed Nov. 25, 2014, 18 pages.
U.S. Appl. No. 13/294,005, filed Nov. 11, 2011, Notice of Allowance mailed Oct. 31, 2014, 24 pages.
U.S. Appl. No. 13/614,899, filed Sep. 13, 2012, Notice of Allowance mailed Mar. 13, 2015, 35 pages.
U.S. Appl. No. 14/060,388, filed Oct. 22, 2013, Notice of Allowance mailed Apr. 13, 2015, 44 pages.
U.S. Appl. No. 13/888,012, filed May 6, 2013 Non-Final Rejection mailed Apr. 6, 2015, 36 pages.
U.S. Appl. No. 13/302,852, filed Nov. 22, 2011, Final Rejection mailed Mar. 30, 2015, 29 pages.
U.S. Appl. No. 13/971,579, filed Aug. 20, 2013 Notice of Allowance mailed Feb. 27, 2015, 28 pages.
European Search Report for EP 12825653 dated Mar. 11, 2015, 7 pages.
Supplementary European Search Report for Application No. EP 12825147 dated Mar. 27, 2015, 9 pages.
The Notice of Allowance by the Mexican Institute of Industrial Property for Mexican Patent Application No. MX/a/2013/014907 dated Feb. 20, 2015 is not translated into English, 1 page.
The second Office Action dated Feb. 26, 2015 for Mexican Pat. Appln. No. MX/a/2013/014217 is not translated into English, 3 pages.
The Notice of Allowance by the Mexican Institute of Industrial Property for Mexican Patent Application No. MX/a/2013/014677 dated Mar. 19, 2015 is not translated into English, 1 page.
Office Action dated Jul. 31, 2015 for Mexican Patent Application No. MX/a/2014/009919, 2 pages.
International Search Report and Written Opinion for PCT/EP2015/069461 mailed Oct. 1, 2015, 13 pages.
International Search Report and Written Opinion for PCT/EP2015/069456 mailed Oct. 5, 2015, all pages.
Supplementary European Search Report for EP 13760902 mailed Oct. 20, 2015, all pages.
Supplementary European Search Report for EP 13761427 mailed Oct. 19, 2015, all pages.
U.S. Appl. No. 13/786,915, filed Mar. 6, 2013, Non Final Rejection mailed Oct. 15, 2015, 59 pages.
U.S. Appl. No. 13/801,994, Non Final Office Action mailed Oct. 7, 2015, 55 pages.
U.S. Appl. No. 14/338,114, filed Jul. 22, 2014, Non-Final Office Action mailed Sep. 30, 2015, all pages.
U.S. Appl. No. 14/529,989, filed Oct. 31, 2014, Non-Final Office Action mailed Nov. 4, 2015, all pages.
U.S. Appl. No. 14/043,617, filed Oct. 1, 2013, Non-Final Office Action mailed Oct. 23, 2015, all pages.
U.S. Appl. No. 14/676,137, filed Apr. 1, 2015, Notice of Allowance mailed Sep. 28, 2015, 35 pages.
U.S. Appl. No. 14/071,613, filed Nov. 4, 2013, Final Office Action mailed Oct. 8, 2015, 11 pages.
U.S. Appl. No. 13/215,598, filed Aug 23, 2011 Non Final Office Action mailed Dec. 15, 2015, all pages.
U.S. Appl. No. 13/801,968, filed Mar. 13, 2013 Final Office Action mailed Nov. 19, 2015, all pages.
U.S. Appl. No. 14/470,392, filed Aug. 27, 2014 Non Final Office Action mailed Nov. 5, 2015, 31 pages.
International Preliminary Report on Patentability for PCT/US2014/033796 issued Nov. 3, 2015, 7 pages.
International Search Report and Written Opinion for PCT/EP2015/069681 mailed Nov. 23, 2015, 12 pages.

\* cited by examiner

PROGRAM GUIDE

| THURSDAY, 3/3 | 7:00 PM | 7:30 PM | 8:00 PM | 8:30 PM | | THURSDAY, 3/3 7:11PM |
|---|---|---|---|---|---|---|
| | WEEKLY | | | | | |
| | WEEKLY UPDATE 3-3-2011 PG-13, TV-PG – SERIES/SPECIAL. MORE VIOLENCE OVERSEAS AND THE PRESIDENT'S REACTION TO THE WARS. (CC) | | | | | |
| BOX HD 031-00 HTYP | MECHANICS 101 | | DESIGNING THE INTERIORS | | MY HD CHANNELS ▶ | |
| U TV 020-00 ZEQM | TRACING PEOPLE | | TRACING PEOPLE | | MY HD CHANNELS | |
| ALM HDTV 009-30 TULA | DORMS | COUPLES | THE STORAGE | OUTDOOR ADVENTURES | MY HD CHANNELS ALL AVAILABLE | ← 136 |
| XYZ HD 007-00 IWAK | STRIKEOUT | | THE DOCTORS EMERGENCY | | PRIMETIME ANYTIME | |
| Q 006-00 KBT PINA | WEEKLY | THINK TANK | GROUP LINE | 30 MIN NEWS | IPTV LIST 2 | |
| ECB 004-00 KNQP | THEORY | RULES | THE POLICE | | LIST 3 LIST 4 END LIST | |
| GS HD 002-00 JINQ | NEWS SHOW | | SECRETS FROM THE 'OTHERS' | | THE BRAINIAC | |
| | | | | | THE PARTY TOWN | |

PROGRAM GUIDE

WEEKLY

WEEKLY UPDATE 3-3-2011
PG-13, TV-PG - SERIES/SPECIAL. MORE VIOLENCE OVERSEAS AND THE PRESIDENT'S REACTION TO THE WARS. (CC)

THURSDAY, 3/3
7:11PM

| THURSDAY, 3/3 | 7:00 PM | 7:30 PM | 8:00 PM | 8:30 PM | MY HD CHANNELS ▾ | |
|---|---|---|---|---|---|---|
| | | | | | 9:00 PM | 9:30 PM |
| BOX HD 031-00 HTYP | MECHANICS 101 | | DESIGNING THE INTERIORS | | NEWS HOUR | |
| U_TV 020-00 ZEQM | TRACING PEOPLE | | TRACING PEOPLE | | NEWS FIRST | TONIGHT'S NEWS |
| ALM HDTV 009-00 TULA | DORMS | COUPLES | THE STORAGE | OUTDOOR ADVENTURES | HISTORY OF ROCKS | HISTORY OF ROCKS |
| XYZ HD 007-00 IWAK | STRIKEOUT | | THE DOCTORS EMERGENCY | | THE INSECT SHOW | |
| Q KBT 006-00 PINA | WEEKLY | THINK TANK | GROUP LINE | 30 MIN NEWS | THE STATES HISTORY SHOW | |
| ECB 004-00 KNQP | THEORY | RULES | THE POLICE | | THE BRAINIAC | |
| | XYZ | | ECB | | BOX | ALM HDTV |
| PRIMETIME ANYTIME! WATCH ALL YOUR FAVORITE PRIMETIME SHOWS ANYTIME! | | | | | | |
| GGTV | HOUSE FINDERS | | HOUSE FINDERS | | HOUSE FINDERS | |
| GS HD 002-00 JINQ | NEWS SHOW | | SECRETS FROM THE 'OTHERS' | | THE PARTY TOWN | |

131

138

| PROGRAM GUIDE | | | | | MECHANICS 101<br>EPISODE 290<br>PG-13, TV-PG - SERIES/SPECIAL. DOUG AND SUSAN LEARN THE BASICS ON HOW TO MAINTAIN THEIR CARS. (CC) | | THURSDAY, 3/3<br>7:11PM |
|---|---|---|---|---|---|---|---|
| THURSDAY, 3/3 | 7:00 PM | 7:30 PM | 8:00 PM | 8:30 PM | | MY HD CHANNELS ▼ | |
| BOX HD 031-00 HTYP | MECHANICS 101 | | DESIGNING THE INTERIORS | | 9:00 PM | | 9:30 PM |
| TV 020-00 ZEQM | TRACING PEOPLE | | TRACING PEOPLE | | NEWS HOUR | | |
| XYZ HD 009-00 ALM HDTV TULA | DORMS | COUPLES | 140 BLOCK GUIDE | OUTDOOR ADVENTURES | NEWS FIRST | HISTORY OF ROCKS | TONIGHT'S NEWS |
| XYZ HD 007-00 IWAK | STRIKEOUT | | THE DOCTORS EMERGENCY | | | | HISTORY OF ROCKS |
| KBT 006-00 PINA | WEEKLY | THINK TANK | GROUP LINE | 30 MIN NEWS | THE INSECT SHOW | | THE STATES HISTORY SHOW |
| ECB 004-00 KNQP | THEORY | RULES | THE POLICE | | THE BRAINIAC | | |
| GS HD 002-00 JINQ | NEWS SHOW | | SECRETS FROM THE 'OTHERS' | | THE PARTY TOWN | | |

| PROGRAM GUIDE | | STRIKEOUT<br>NOT RESPONSIBLE<br>EPISODE 43<br>PG-13, TV-PG - SERIES/SPECIAL REALITY SHOW WHERE CONTESTANTS FIGHT IT<br>OUT TO SEE WHO WINS THE ULTIMATE PRIZE...(CC) | | | | THURSDAY, 3/3<br>7:11PM |
|---|---|---|---|---|---|---|
| | | | | | PRIMETIME ANYTIME ▼ | |
| THURSDAY, 3/3 | 7:00 PM | 7:30 PM | 8:00 PM | 8:30 PM | 9:00 PM | 9:30 PM |
| BOX HD 031-00<br>HTYP | MECHANICS 101 | | DESIGNING THE INTERIORS | | NEWS HOUR | |
| ALM HDTV 009-00<br>TULA | DORMS | COUPLES | THE STORAGE | OUTDOOR ADVENTURES | HISTORY OF ROCKS | HISTORY OF ROCKS |
| XYZ HD 007-00<br>IWAK | STRIKEOUT | | THE DOCTORS EMERGENCY | | THE INSECT SHOW | |
| ECB 004-00<br>KNQP | THEORY | RULES | THE POLICE | | THE BRAINIAC | |
| | XYZ | | ECB | | BOX | ALM HDTV |
| PRIMETIME ANYTIME!<br>WATCH ALL YOUR FAVORITE<br>PRIMETIME SHOWS ANYTIME! ← 138 | | | | | ← 132 | |

FIG.7

PROGRAM GUIDE

STRIKEOUT
NOT RESPONSIBLE
EPISODE 43
PG-13, TV-PG - SERIES/SPECIAL. REALITY SHOW WHERE CONTESTANTS FIGHT IT OUT TO SEE WHO WINS THE ULTIMATE PRIZE...(CC)

THURSDAY, 3/3
7:11PM

PRIMETIME ANYTIME ▸

| THURSDAY, 3/3 | 7:00 PM | 7:30 PM | 8:00 PM | 8:30 PM | 9:00 PM | 9:30 PM |
|---|---|---|---|---|---|---|
| BOX HD 031-00 HTYP | MECHANICS 101 ▸ | | DESIGNING THE INTERIORS ▸ | | NEWS HOUR ▸ | |
| XYZ HD 009-00 ALM HDTV TULA | DORMS ▸ | COUPLES ▸ | TH 2/24 2/17 2/10 | | HISTORY OF ROCKS ▸ | HISTORY OF ROCKS ▸ |
| ECB HD 007-00 IWAK | STRIKEOUT | | | | THE INSECT SHOW ▸ | |
| 004-00 KNQP | THEORY ▸ | RULES ▸ | THE POLICE ▸ | | THE BRAINIAC ▸ | |
| | XYZ | | ECB | | ALM HDTV | |

PRIMETIME ANYTIME!
WATCH ALL YOUR FAVORITE
PRIMETIME SHOWS ANYTIME!

BOX

USER INTERFACE

CROSS-REFERENCE TO RELATED APPLICATIONS

This application is a Continuation of U.S. application Ser. No. 13/324,831 filed Dec. 13, 2011 and entitled "USER INTERFACE," which claims the benefit under 35 U.S.C. §119(e) of U.S. Provisional Patent Application No. 61/526,565, which was filed on Aug. 23, 2011, and entitled "User Interface," both of which are hereby incorporated by reference for all purposes as if fully set forth herein.

FIELD OF THE INVENTION

The present application relates generally to grouping, transmitting, storing, and providing access to information. More particularly, the present application relates to grouping transmitting, storing, and providing access to audiovisual content based on selected television channels and selected times. Still more particularly, the present application relates to providing a user interface for accessing the audiovisual content.

SUMMARY

In one implementation, systems and methods of providing access to a block of content may include determining a block of content from a plurality of instances of received content being received by a tuner from a same frequency band of at least one content provider broadcast or a stored instances of such content and transmitting a block list including such block content in response to a user request. Content from the block list may be accessed in response to selections received in response to presentation of the block list. The method may also include transmitting a general EPG at a content receiver for display on a presentation device. The EPG may include a plurality of channels having a plurality of programs available at a plurality of times. The block list may be configured as a block guide that includes a plurality of channels having a plurality of programs available for a selected airing time.

In another implementation, systems and methods for providing access to content may include determining a block of content from a plurality of instances of received content being received by a tuner from a same frequency band of at least one content provider broadcast or a stored instances of such content and transmitting a block list including such block content in response to a user request. The method may also include receiving user input requesting display of an instance of content available in the block list and determining if the program is available live or from a stored state. The method may also include transmitting the content to the presentation device live if the program is available live. However, where the program is not available live, the method may include accessing the block of stored content and transmitting the stored content to the presentation device. The block list may be configured as a block guide that may include a plurality of channels having a plurality of programs available for a selected airing time and the airing time may correspond to a time frame for which content has been or is scheduled to be stored as a block of stored content.

In various implementations, a user interface may be provided that may include a menu displayed at a presentation device and associated with a block of content. The menu may include an arrangement of television network names along a first side of the menu, the network names each being associated with a network defined by network content in the block of content, wherein each network is related to the other named networks by an attribute. The menu may also include an arrangement of time slots along a second side of the menu. The second side of the menu may be substantially orthogonal to the first side to form a tabular display and the time slots may fill a time window having a selected start time and a selected end time. The menu may also include references to content arranged in the tabular display, each reference corresponding to a network name and at least one time slot.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIG. 3 is a diagram of an electronic program guide showing an option for accessing a block guide, according to some implementations.

FIG. 4 is a diagram of an electronic program guide showing another option for accessing a block guide, according to another implementation.

FIG. 5 is a diagram of an electronic program guide showing another option for accessing a block guide, according to another implementation.

FIG. 7 is a diagram of the block guide of FIG. 6 with a highlighted block guide bar.

FIG. 8 is a diagram of an additional block guide.

DETAILED DESCRIPTION

The description that follows includes sample systems, methods, and computer program products that embody various elements of the present disclosure. However, it should be understood that the described disclosure may be practiced in a variety of forms in addition to those described herein.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

Figure 1:
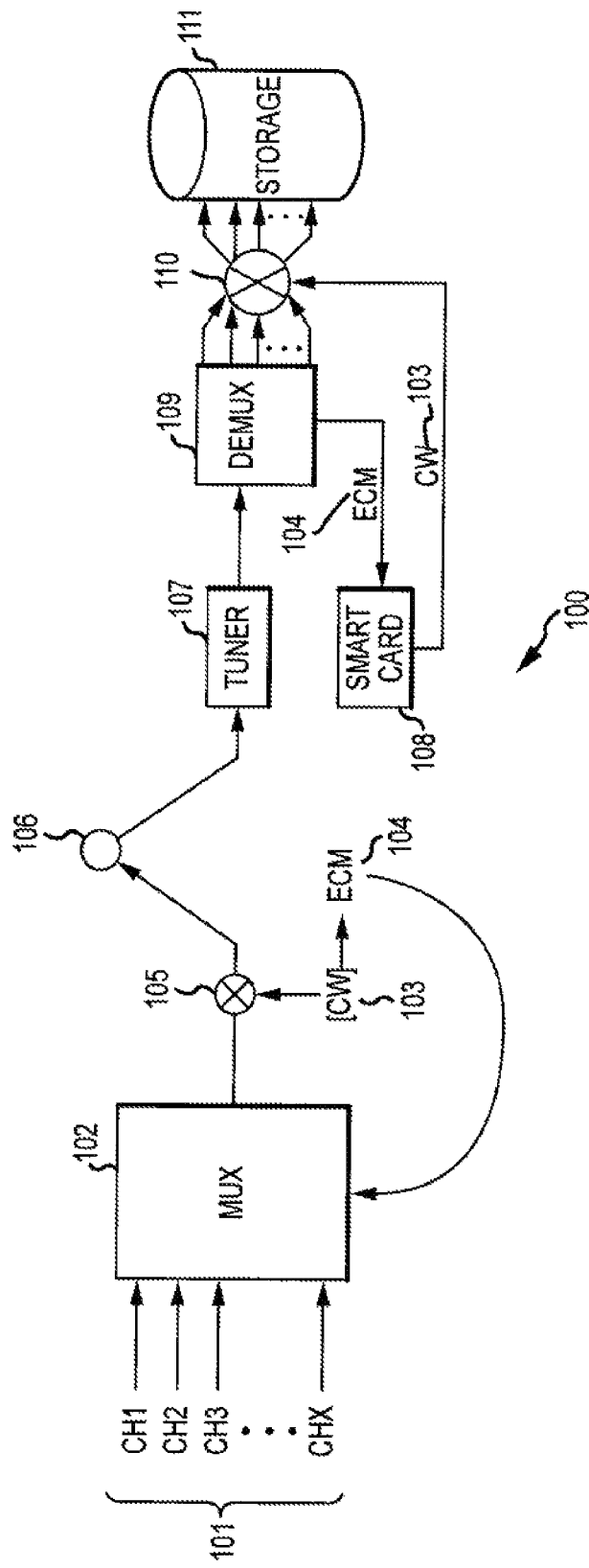
FIG. 1 is a schematic diagram of a system according to some implementations.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "primetime events" associated with all channels defined as "primetime television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

In at least one embodiment, the tuner 107 may receive multiple instances of content which may be simultaneously recorded and/or watched by one or more users. For example, in one embodiment, the tuner 107 may operate to receive instances of content (e.g., multiple television channels or multiple programs) multiplexed together on single tuned frequency. Furthermore, in at least one embodiment, each of the multiple instances of content may be encrypted using a single control word. As described above, the multiple instances of content may be received, decrypted and/or stored onto the storage medium 111. Simultaneously, a user may request to view one or/more of the received programs. A receiver may demodulate and output the signal to a presentation device for presentation to a user. In association with reception of the content, the receiver performs appropriate processing to select portions of the received plurality of content associated with the selected channel for further processing and output.

In at least one embodiment, a single tuner 107 and smart card 108 may be utilized to receive, process and output multiple instances of content to multiple devices simultaneously. For example, the tuner 107 may simultaneously receive content associated with the big four tv networks (CBS, NBC, ABC, Fox) which are encrypted using the same control word and multiplexed into the same tuned frequency. The smart card 108 performs processing for simultaneously decrypting a plurality of the channels and the decrypted signals may be output to multiple presentation devices, either using the same output device (e.g., one set-top box with multiple outputs) or via multiple output devices which are communicatively coupled over a network or other communication link (e.g., multiple set-top boxes).

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the control word prior to multiplexing. In another example, in some implementations, the data received via the tuned frequency may be descrambled utilizing the control word before being demultiplexed.

The multiple instances of content have been described in the context of primetime television and thus the multiple instances of content have been described as relating to content available on selected popular network television channels during a particular period of the day. In other implementations, the multiple instances of content may be related to otherwise related channels. That is, rather than primetime channels, the multiple instances of content may include a group of selected sports channels, decorating channels, shopping channels, cartoon channels, cooking channels, or other groups of channel related by subject matter and may further include a time period within which these channels are commonly watched. For example, multiple instances of content may include a group of morning talk shows and may cover a time period from approximately 7:00 am to 10:00 am. Other groups may include afternoon talk shows, soaps, or news broadcasts. Other multiple instances of content may include groups of channels selected based on demographics of a group of users, for example. That is, where a study is performed suggesting that a particular group of users watches a particular set of channels in a particular time period each day, the particular channels within that time period may define multiple instances of content.

The multiple instances of content may also include information and/or data and may thus not be limited to television programming or audiovisual content, for that matter. For example, a bundle of data or a bundle of groups of data may also be processed as described above. Where a single CW is used for the several groups of data, the several channels, or other instances of content or information, large volumes of data and/or content may be transmitted without requiring multiple tuners to receive each of the multiple instances of content, without requiring the smart card to decrypt multiple ECMs, and/or without requiring the combiner 109 to have to descramble multiple signals. Accordingly, while the remaining portion of the application may include reference to primetime television and thus be focused on a particular set of channels for a particular period of time, other groups of content may also be provided and the methods, menus, and systems for accessing the content may be reflective of the type of content or information stored.

Figure 2:
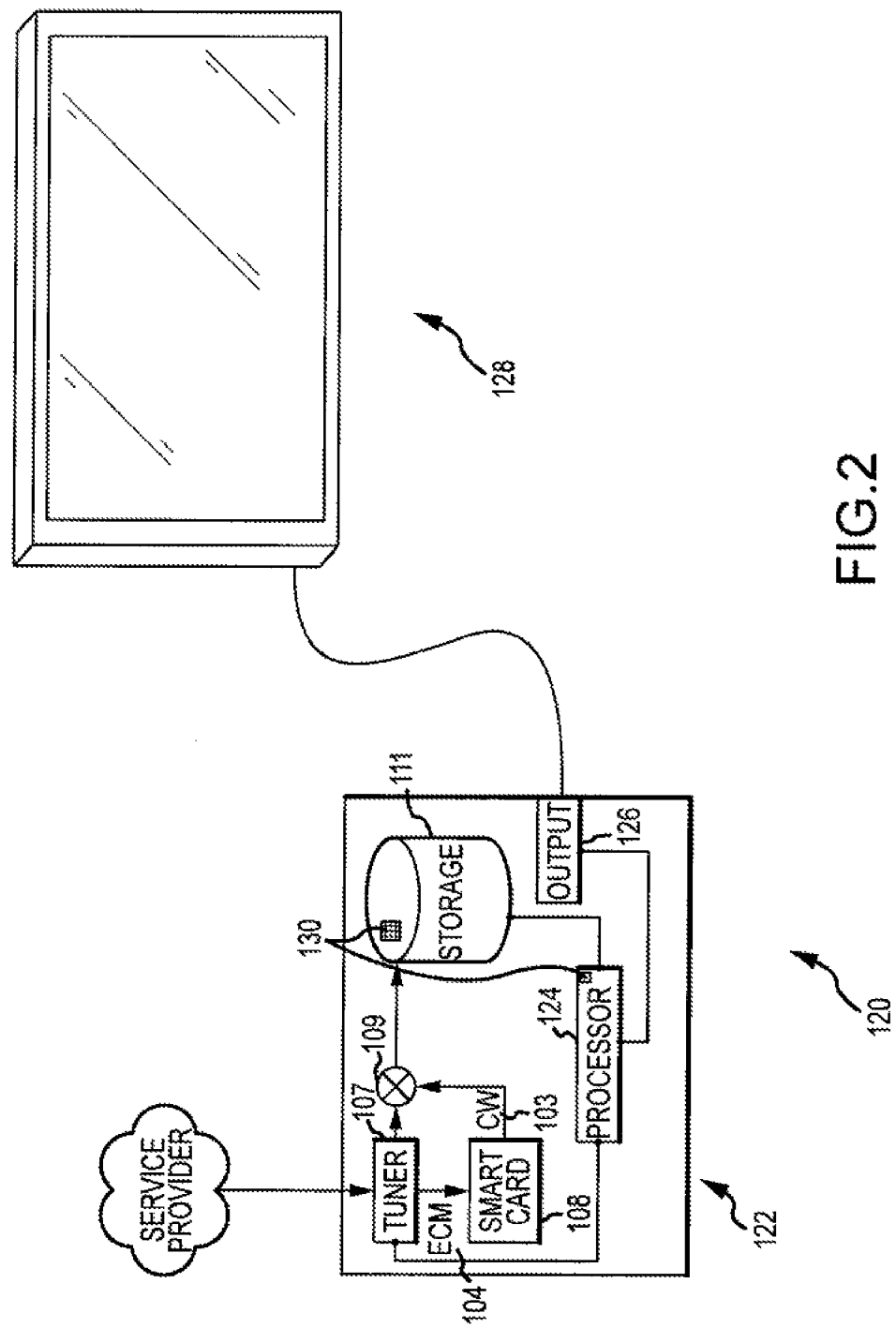
FIG. 2 is a diagram of another system including portions of the system according to FIG. 1.

Referring now to FIG. 2 a system 120 for accessing and displaying the multiple instances of content may be described. The system 120 may include some parts of the system 100 shown in FIG. 1 as part of a content receiver 122. The content receiver 122 may further include a processor 124 and an output 126. The system 120 may also include a presentation device 128 connected to the output 126 of the content receiver 122. The content receiver 122 may be configured for performing the storage function of the system of FIG. 1 and may also be configured for processing information from the service provider and/or processing data stored in the storage medium 111. The content receiver 122 may also be configured for interfacing with a user to receive commands or instructions. As such, the content receiver 122 may include an interfacing module 130 for processing menu related data, for example. The interfacing module 130 may receive menu data from a service provider or read the data from the storage medium 111. The interfacing module 130 may send menus to the presentation device for display and may receive input from the user via a remote control used by the user in conjunction with the menu. The interfacing module 130 may adjust, change, or adapt the displayed menu based a users selections and/or predefined preferences. Upon selection of content, the content receiver 122 may also send selected content or other content to the presentation device for display. The presentation device 128 may be configured for receiving the content or information from the content receiver 122 and displaying the content or information for viewing and/or interaction by the user.

The interfacing module 130 may include software, hardware, or a combination of software and hardware configured for interfacing with the user. In some implementations, the interfacing module 130 may include computer-implemented instructions stored on the computer readable storage medium 111 in the content receiver 122, for example. The computer-implemented instructions may be for displaying particular menus and waiting for user input relating to the menus and either displaying an additional menu or prompting the user based on user input or accessing the content selected by the user. The interfacing module 130 may also include databases, tables, or otherwise arranged files for storing information for populating the menus. The databases, tables, or otherwise arranged files may be updated periodically with additional information relating to current programming availability.

Although the content receiver 122 is illustrated and described above as including the tuner 107 and the storage 111, it is understood that other arrangements are possible without departing from the scope of the present disclosure. For example, in various implementations the tuner 107 and/or the storage 111 may be components of another content receiver (not shown) with which the content receiver 122 is configured to communicate. As such, the content receiver 122 may be operable to communicate with the other content receiver in order to access and/or present content received and/or stored by the other content receiver. In such cases, the content receiver 122 may not include a tuner and/or storage similar to the tuner 107 and the storage 111.

Figure 6:
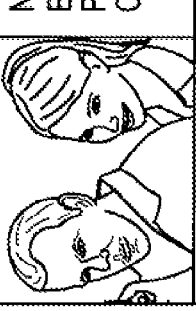
FIG. 6 is a diagram of a block guide according to some implementations.

Referring now to FIGS. 3-7, a series of selection of menus are shown. Where a block of content, or series of blocks of content, is received and processed as described with respect to FIG. 1, the block of content may be accessible live or from a stored state by a user via one or more dedicated interfaces. That is, an interface may be provided that is particularly adapted for displaying selection options relating to the content being streamed to or stored in the block. In the context of television programming, the dedicated interface may be in the form of a dedicated electronic programming guide (EPG) or block guide 132 (though in some cases a block list may be presented that is not configured as a block guide or other kind of dedicated programming guide). In one implementation, the block guide 132 may include one or more menu screens relating to primetime television and, as such, may include one or more menu screens relating to programming content on, for example, ABC, CBS, NBC, and FOX, from seven PM to ten PM as shown in FIGS. 6 and 7. Other networks, time frames, and other groupings of shows may also be provided. Programming that aired on different days or weeks may also be accessible within the block guide 132. For example, previous episodes of a program may be accessible. This dedicated EPG or block guide 132 may be compiled in one more ways, it may be accessible in one or more ways, and it may include one or more menu screens for accessing content in the block or in related blocks.

In some implementations, the block guide 132 may be a condensed or alternative version of an associated or general EPG usable by a user to access programs outside the block of content. As such, in some implementations, the block guide 132 may be developed by accessing the general EPG and extracting or displaying portions of the general EPG. This process may be performed by, for example, a content receiver 122 or this process may be performed by a service provider. In other implementations, the block guide 132 may be developed wholly separate from the general EPG, but the block guide 132 may still have some overlapping information with the general EPG. The block guide 132, in this implementation, may be developed by a service provider, for example, and transmitted with, or separate, from the block of content. In any of the above cases, the block guide 132 may be stored at a content receiver 122 and a user may access the block guide 132 in several ways.

Referring now to FIG. 3, a view of a general EPG 131 is shown where options are included for a user to select content including content within or outside the block of content. As shown, the general EPG 131 may include a drop down menu 134 allowing a user to select the format in which they would like to have their program options displayed. The drop down menu 134 may include a block guide option 136. The user may scroll to the block guide option 136 and select the block guide option 136 and the system may present a block guide 132 such as one of those shown in FIGS. 6 and 7, for example. It is noted that other selection options may be provided other than a drop down menu 134. A list menu, a radio button menu, a series of push buttons, or other interface menu options may also be provided.

Referring now to FIG. 4, another view of a general EPG 131 is shown. As with FIG. 3, this general EPG 131 may be arranged to show a series of television channels and the programs available on those channels for several time ranges. As shown, this general EPG 131 may include a channel option in the form of a block guide bar 138. The block guide bar 138 may be arranged between any of the channel selections and it may extend across the whole of the time ranges available. In some implementations, the block guide bar 138 may be arranged near or within the series of channels available in the block guide 132. That is, as shown, block guide bar 138 may be arranged adjacent to the CBS network channel selection, for example. Other locations may be provided and may be selected such that the user can associate the block guide bar 138 with channels available in the block guide 132 or such that the user can at least view the block guide bar 138 when viewing programming options available on channels associated with the block guide 132.

Referring now to FIG. 5, still another view of a general EPG 131 is shown. In this implementation, an interactive feature may be provided allowing the user to access the block guide 132. As shown, the interactive feature may include a pop-up selection 140. The pop-up selection 140 may be triggered when a user highlights, scrolls across, or otherwise preliminarily selects a selection option on one of the channels included in the EPG 131. For example, as shown, a user has highlighted a program on FOX at seven PM. Upon highlighting the program, the general EPG 131 may present a pop-up 140 asking or suggesting that the user use the block guide 132. The pop-up 140 may read "primetime anytime" for example. The pop-up 140 may be triggered when the user scrolls across any program listed for a channel included in the block guide 132. That is, the pop-up 140 may be triggered when the user scrolls across the FOX channel, for example, at any time of day including times outside the timeframe included in the block guide 132. In other implementations, the pop-up 140 may only be triggered when the user scrolls across a program within the time frame included in the block guide 132. In any of the above cases, upon being presented with the pop-up 140, the user may select the pop-up 140 and the system may display a block guide 132, for example, as shown in FIGS. 6 and 7.

In any of the above-mentioned access options, a block guide 132 may be presented revealing content for a particular day. Depending on the time of day the block guide 132 is accessed and the time frame of content available in the block guide 132, a previous day's content or a current day's content may be presented. In some implementations, the day's content that is presented may be based on a cut-off time. For example, where the content in the block of stored content relates to programming available from seven PM to ten PM, a cut-off time of four PM may be established. That is, where the block guide 132 is accessed before four PM, the previous day's content may be presented. However, if it is after four PM, but before the start time of the block window, the current day's content may be presented and may be highlighted as upcoming, for example. The content in the block guide 132 may be presented in a grayscale or other dimmed presentation to indicate that the programming is not yet available. Where the block guide 132 is accessed during the block window, the current day's programming may be presented and the programming that has begun may be presented as available and other programming may be grayed or otherwise signaled as not available. Other cut-off times may be used. For example, the cut-off time may be set to the start time of the block window and accessing the block guide 132 may show the previous day's content until the current day's content begins to be received. Still other cut-off times may be also be used. In some implementations, a user option may be provided for setting the cut-off time. In any of the above-mentioned cut-off time scenarios, the system 120 may check the cut-off time upon being instructed to access the block guide 132 and may compare the current time to the cut-off time to determine which day's block guide 132 to display.

In some implementations, the block guide 132 may be offered to users as an additional service and accessing the block guide 132 may be conditional upon having subscribed to the block guide service. In this implementation, where a user accesses the block guide 132, the system 120 may check for rights to access the block guide 132. Where a user has rights, the block guide 132 may be presented. Where the user does not have rights, an inactive version of the block guide 132 may be presented. For example, an inactive version may include a grayscale type menu such that the potential subscriber can view what the block guide 132 looks like and thus begin to understand how it might work and why they may be interested in subscribing. However, selections within the block guide 132 may not be active and the user may not be able to use the block guide 132 to select content to be displayed. Alternatively, where a user does not have rights, an informational screen may be provided. An informational screen may include a description of the block guide service program and may also include ordering information, for example. A menu of options may be presented on either an inactive block guide or an informational screen including a back button for returning to a previous guide screen and an ordering button, for example. A combination of an inactive block guide and an informational screen may also be provided.

Referring now to FIG. 6, one implementation of a block guide 132 is shown. The block guide 132 may include an interface for accessing the content in the block of content and, as such, may include a table, chart, listing, or other menu reflecting the content available in the block of content. In the context of television programming, for example, the block guide may include one or more channels 142 and the programming available on those channels for a selected airing time 144. The selected airing time 144 may correspond to the time frame or block window within which the block of stored content is received and stored in accordance with FIG. 1. As shown, for example, the block guide 132 may include channels associated with ABC, CBS, NBC, and FOX and may include programming on those channels extending from seven PM to ten PM.

A user may access the block guide 132 in one of the ways mentioned above and may peruse the block guide 132. The user may select a program to view from the block guide 132 and the content receiver 122 may transmit the associated content to the presentation device for viewing. The content receiver 122 may check the content requested and determine whether the selection relates to a live running program or whether the selection relates to stored content. Where the content requested relates to a live running program, the content receiver 122 may receive and transmit the live content. However, where the content requested relates to stored content, the content receiver 122 may access the stored content and transmit the stored content. In some implementations, for example, where a selected program is currently being aired live, but began earlier, the content receiver 122 may prompt the user with a question or selection list requiring input regarding whether they would like to view the program from the beginning or tune in to the live broadcast of the content. The selection list may include "beginning" and "live" options, for example.

Referring now to FIG. 7, a block guide 132 is shown, similar to that shown in FIG. 6. In this figure, however, the block guide bar 138 is shown highlighted and selected by the user. The block guide bar 138 in this view may provide the user with access to a different menu than the block guide bar 138 shown in FIG. 4, for example. That is, the block guide bar 138 in FIG. 4, may bring the user to the block guide 132. In FIG. 7, however, the user is already viewing the block guide 132. As such, selection of the block guide bar in FIG. 7, may provide the user with access to a block guide informational screen. In one implementation, the block guide informational screen may include options for configuring the user's block guides 132. In other implementations, the block guide informational screen may include a listing of available block guides 132. That is, for example, a listing of previous or other days block guides 132 may be shown and available for selection. Other information may also be provided on the block guide informational screen. It is also noted that the block guide bar 138 may be provided in a block guide 132 and may be active when the remaining portion of the block guide 132 is inactive. That is, for example where the block guide 132 is accessed by a non-subscriber, the block guide 132 may be inactive as described above, but the block guide bar 138 may be active. As such, when the block guide bar 138 is selected, an informational screen or an order screen may be presented for the user.

Referring now to FIG. 8, an additional block guide 132 is shown. In this implementation, some of the programs shown include an additional selection option relating to previous episodes. As such, for programs that are part of a series, an additional selection option may be provided. In some implementations, the additional selection option may expand in the form of a list 146 upon scrolling across a particular program. For example, as shown, when scrolling across the program available on FOX at eight PM, an additional list 146 may be presented including previous dates or previous episode names or other indications of previous episodes available via a block of content other than the one reflected in the currently presented guide 132.

In other implementations, the additional selection option 146 may include a link to a menu relating to the associated program. For example, the link may indicate that related episodes, other episodes, or previous episodes are available. Selection of the link by the user may cause the system to display a menu relating to the selected program. The menu may include a general description of the program and may include links to all available episodes, for example.

As described above, a single content receiver may be utilized to simultaneously receive and/or output one or more instances of content receive in a multiplexed signal. Thus, a tuner and smart card combination may be operable to receive multiple instances of content (e.g., multiple channels) simultaneously, which are available for viewing by a user. In accordance with some implementations, a tuner and smart card may be configured to receive and stored multiple channels at once, such as multiple channels broadcast during primetime viewing. While in use to record the multiple channels of content, the tuner may be unavailable to receive content on other frequencies. Thus, a user may not be able to change the tuner to receive some programs. Nonetheless, the user may be able to channel surf within the plurality of instances of content which are currently being received by the tuner. For example, a user may surf between the big four TV networks which are being simultaneously received by a tuner using a single control word.

In accordance with implementations described herein, a content receiver may be configured to identify one or more instances of content being received by a tuner from the same frequency band of at least one content provider and generate a block list of available programs including the one or more instances of content. For example, a receiver may identify that a tuner is being utilized to currently receive four channels, of which one channel of content may be currently output by the receiver for presentation to a user. The receiver may generate a block list for output which identifies the other three instances of content which are available to the user via the tuner at the present time. Thus, the user can select another channel presently being received by the tuner for output by the receiver. The block list may be output in any appropriate manner, such as overlaid onto a presently watched instance of content, or output as a separate menu, EPG or the like. In at least one embodiment, the receiver may include an option, selected via one or more menus, which allows the user to enter a limited channel surfing mode within the multiple instances of receiver content by receiver by a tuner. For example, the user may provide input to change a channel (e.g., via a channel up and down key), in which the receiver does not move numerically through all channels offered by a content provider, but rather moves through a subset of channels currently being received by a tuner.

Although FIGS. 3-8 and the above illustrate and describe generation and/or presentation of a block list that is configured as a block guide, other arrangements are possible. Though in some implementations a block guide may presented as illustrated and described, in other implementations the block list may list instance of content included in a block of content and may not be configured as a plurality of channels having a plurality of programs available for a schedule air time and/or may not be configured to include one or more of the various block guide features illustrated in FIGS. 3-8 and discussed above.

In the present disclosure, the methods disclosed may be implemented as sets of instructions or software readable by a device. Further, it is understood that the specific order or hierarchy of operations in the methods disclosed are examples of sample approaches. In other implementations, the specific order or hierarchy of operations in the method can be rearranged while remaining within the disclosed subject matter. The accompanying method claims present elements of the various operations in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context or particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A method for providing access to a block guide, the method comprising:
    recording, by a content receiver, a plurality of instances of television programs on a plurality of television channels in response to received instructions from a content provider, wherein:
        the content provider broadcast the plurality of television channels on a single frequency band; and
        each television channel of the plurality of television channels are recorded during a same time period on multiple days in response to the received instructions from the content provider;
    outputting, by the content receiver, for presentation, an electronic programming guide, wherein:
        the electronic programming guide comprises a plurality of columns corresponding to time periods, and a plurality of rows corresponding to television channels,
        the plurality of rows and the plurality of columns define a plurality of cells corresponding to at least a subset of the plurality of television channels;
    receiving, by the content receiver, a first selection of an instance of a television program from the at least the subset of the plurality of television channels presented in the electronic programming guide;
    determining, by the content receiver, the block guide is available due to the television program having been recorded on the single frequency band in response to the received instructions from the content provider;
    in response to determining that the block guide is available due to the television program having been recorded on the single frequency band in response to the received instructions from the content provider, outputting, by the content receiver, an indication that the block guide is available for the television program, the indication of the block guide being presented on the electronic programming guide;
    receiving, by the content receiver, a second selection of the television program; and
    in response to the second selection, outputting, by the content receiver, the block guide for presentation, wherein:
        the block guide comprises multiple previously recorded episodes of the television program, and
        each of the previously recorded episodes are from the plurality of instances of television programs on the plurality of television channels recorded on the plurality of television channels in response to the received instructions from the content provider on the single frequency band.

2. The method for providing access to the block guide of claim 1, wherein the block guide is output for presentation as a popup over the electronic programming guide.

3. The method for providing access to the block guide of claim 1, further comprising:
    outputting, by the content receiver, a block guide bar incorporated with the electronic programming guide;
    receiving, by the content receiver, a selection of the block guide bar; and
    in response to the selection of the block guide bar, outputting, by the content receiver, information about the recorded plurality of television channels.

4. The method for providing access to the block guide of claim 3, wherein the information about the recorded plurality of television channels comprises a listing of block guides specific to particular days.

5. The method for providing access to the block guide of claim 3, wherein the information about the recorded plurality of television channels corresponds to the previous day when prior to a cutoff time of time and the information about the recorded plurality of television channels corresponds to the current day when after the cutoff time of day.

6. The method for providing access to the block guide of claim 1, further comprising:
    descrambling, by the content receiver, the plurality of television programs on the plurality of television channels using a single control word.

7. The method for providing access to the block guide of claim 1, wherein the plurality of television channels are four television networks received via a same tuner of the content receiver.

8. A system for providing access to a block guide, the system comprising:
    one or more processors; and
    a memory communicatively coupled with and readable by the one or more processors and having stored therein processor-readable instructions which, when executed by the one or more processors, cause the one or more processors to:
        record a plurality of television programs on a plurality of television channels in response to received instructions from a content provider, wherein:
            the content provider broadcast the plurality of television channels on a single frequency band; and
            each television channel of the plurality of television channels are recorded during a same time period on multiple days in response to the received instructions from the content provider;
        output for presentation, an electronic programming guide, wherein:
            the electronic programming guide comprises a plurality of columns corresponding to time periods, and a plurality of rows corresponding to television channels, and the plurality of rows and the plurality of columns define a plurality of cells corresponding to at least a subset of the plurality of television channels;

receive a selection of a television program from at least subset of the plurality of television channels presented in the electronic programming guide;

determine the block guide is available due to the television program having been recorded on the single frequency band in response to the received instructions from the content provider; and in response to the selection and determining that the block guide is available due to the television program having been recorded on the single frequency band in response to the received instructions from the content provider, output the block guide for presentation, wherein:

the block guide comprises multiple previously recorded episodes of the television program, and each of the previously recorded episodes are from the plurality of instances of television programs on the plurality of television channels recorded on the plurality of television channels in response to the received instructions from the content provider on the single frequency band.

9. The system for providing access to the block guide of claim 8, wherein the block guide is configured to be output for presentation as a popup over the electronic programming guide.

10. The system for providing access to the block guide of claim 8, wherein the processor-readable instructions, when executed, further cause the one or more processors to:

output a block guide bar incorporated with the electronic programming guide;

receive a selection of the block guide bar; and in response to the selection of the block guide bar, output information about the recorded plurality of television channels.

11. The system for providing access to the block guide of claim 10, wherein the block guide bar is incorporated with the electronic programming guide as a row.

12. The system for providing access to the block guide of claim 10, wherein the information about the recorded plurality of television channels comprises a listing of block guides specific to particular days.

13. The system for providing access to the block guide of claim 10, wherein the information about the recorded plurality of television channels corresponds to the previous day when prior to a cutoff time of time and the information about the recorded plurality of television channels corresponds to the current day when after the cutoff time of day.

14. The system for providing access to the block guide of claim 8, wherein the plurality of television channels are four television networks.

15. A non-transitory processor-readable medium for providing access to a block guide, comprising processor-readable instructions configured to cause one or more processors to:

record a plurality of instances of television programs on a plurality of television channels in response to received instructions from a content provider, wherein:

the content provider broadcast the plurality of television channels on a single frequency band; and each television channel of the plurality of television channels are recorded during a same time period on multiple days in response to the received instructions from the content provider;

output for presentation, an electronic programming guide, wherein:

the electronic programming guide comprises a plurality of columns corresponding to time periods, and a plurality of rows corresponding to television channels, the plurality of rows and the plurality of columns define a plurality of cells corresponding to at least a subset of the plurality of television channels;

receive a selection of a television program from at least the subset of the plurality of television channels presented in the electronic programming guide;

determine the block guide is available due to the television program having been recorded on the single frequency band in response to the received instructions from the content provider; and in response to the selection and determining that the block guide is available due to the television program having been recorded on the single frequency band in response to the received instructions from the content provider, output the block guide for presentation, wherein:

the block guide comprises multiple previously recorded episodes of the television program, and each of the previously recorded episodes are from the plurality of instances of television programs on the plurality of television channels recorded on the plurality of television channels in response to the received instructions from the content provider.

16. The non-transitory processor-readable medium for providing access to the block guide of claim 15, wherein the block guide is configured to be output for presentation as a popup over the electronic programming guide.

17. The non-transitory processor-readable medium for providing access to the block guide of claim 15, wherein the processor-readable instructions are further configured to cause the one or more processors to:

output a block guide bar incorporated with the electronic programming guide;

receive a selection of the block guide bar; and in response to the selection of the block guide bar, output information about the recorded plurality of television channels.

18. The non-transitory processor-readable medium for providing access to the block guide of claim 17, wherein the information about the recorded plurality of television channels comprises a listing of block guides specific to particular days.

19. The non-transitory processor-readable medium for providing access to the block guide of claim 17, wherein the information about the recorded plurality of television channels corresponds to the previous day when prior to a cutoff time of time and the information about the recorded plurality of television channels corresponds to the current day when after the cutoff time of day.

20. The non-transitory processor-readable medium for providing access to the block guide of claim 15, wherein the plurality of television channels are four television networks.

* * * * *